(No Model.) 2 Sheets—Sheet 1.
E. SCHMIDLIN.
COFFEE GRINDING MILL.
No. 493,655. Patented Mar. 21, 1893.
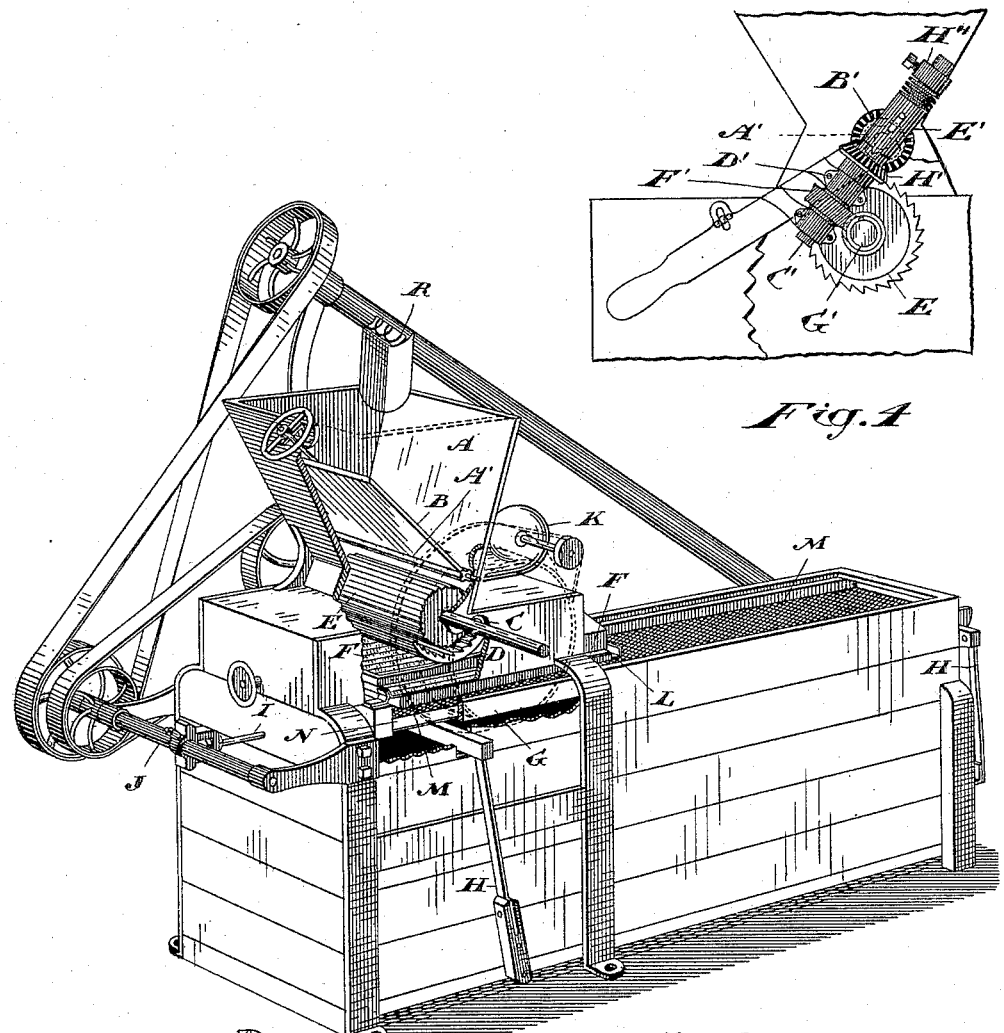
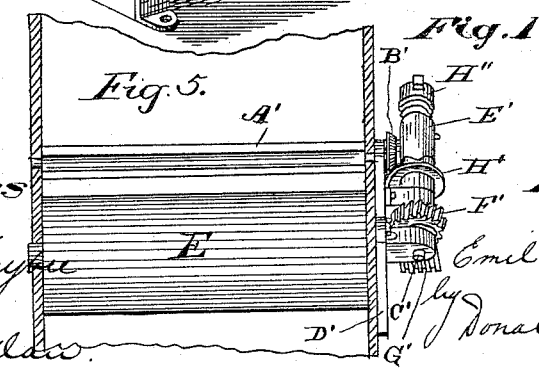

(No Model.) 2 Sheets—Sheet 2.

E. SCHMIDLIN.
COFFEE GRINDING MILL.

No. 493,655. Patented Mar. 21, 1893.

Witnesses
J. Edw. Maybee
W. G. McMillan

Inventor
Emil Schmidlin
by Donald C. Ridout & Co.
Attys.

UNITED STATES PATENT OFFICE

EMIL SCHMIDLIN, OF BRANTFORD, CANADA.

COFFEE-GRINDING MILL.

SPECIFICATION forming part of Letters Patent No. 493,655, dated March 21, 1893.

Application filed February 23, 1892. Serial No. 422,428. (No model.)

*To all whom it may concern:*

Be it known that I, EMIL SCHMIDLIN, of the city of Brantford, in the county of Brant, in the Province of Ontario, Canada, have invented a certain new and useful Improvement in Coffee-Grinding Mills, of which the following is a specification.

The object of the invention is to make a coffee mill which will thoroughly grind the coffee beans and perfectly separate the husks and other light foreign matter from the coffee; and it consists, essentially, in the construction and arrangement of parts hereinafter more particularly explained, and then definitely claimed.

Figure 3:
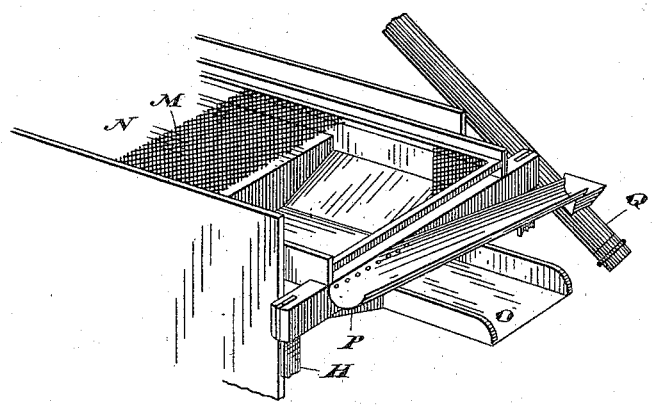
Figure 2:
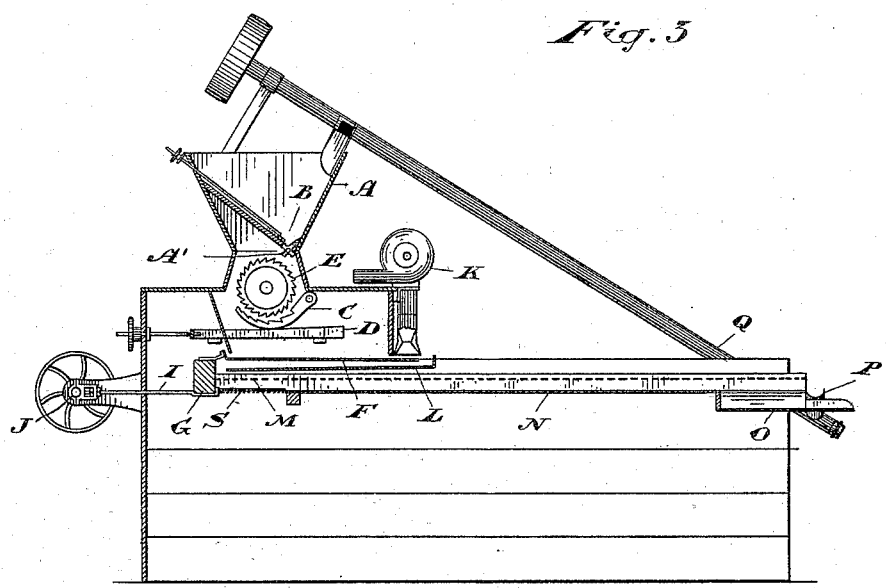

In the accompanying drawings, Figure 1, is a perspective view, partially broken away to expose the interior construction of my improved coffee mill. Fig. 2, is a longitudinal sectional elevation of the mill. Fig. 3, is a detail of the end of the screen-shoe showing a spout for delivering the ground coffee, and a spout to carry the coarse coffee into an elevator to convey it back to the grinder. Figs. 4, and 5 are details of the feed roller driving mechanism.

In the drawings A, is a hopper into which the coffee beans are placed. The lower end of this hopper is closed as shown by a longitudinally corrugated feed roller A'. On the outer end of the feed roller A', is fixed a bevel pinion B', meshing with a bevel pinion H', loose on the shaft C'. This shaft C', revolves in a bearing D', pivoted on the end of the feed roller shaft. The other end of the bearing D', is provided with a handle and is adjustably held against the casing of the machine by a thumb screw as shown. A spring clutch E', slides on the shaft C', and revolves with it as shown.

On the lower end of the shaft C', is a worm wheel F', engaging with the worm G', on the end of the shaft of the grinding roller E. In consequence of this connection, a regular motion is imparted to the feed roller A' by the grinding roller E, and if the feed-roller A' is stopped by a nail or any hard substance, the bevel pinions B' and H' are stopped. The motion of the grinding roller E continues to revolve the shaft C' by means of the worm G' and worm-wheel F'. As the upper half of the clutch E' revolves with the shaft C', as indicated, and the lower half is fast to the pinion H' and as the two parts revolve very readily on one another, the continued motion of the grinding roller conveys no motion to the feed roller. As very little force is sufficient to stop the feed roller, no damage is done to the feed mechanism by a nail or any hard substance getting in the stock and no such substance can be forced through the feed to damage the grinding mechanism. By means of the adjustable collar H'', the pressure of the spring of the clutch E', may be adjusted as desired. By means of the handle of the bearing D', the worm wheel F', may be thrown out of gear with the worm G', when desired or may be adjusted.

The feed roller A', being shaped and driven as shown furnishes a steady supply of stock to the grinding roller and exactly proportionate to the speed of the grinding roller. This hopper is provided with a sliding bottom B, having an adjusting screw for regulating the size of the discharge opening. The coffee beans fall from the feed roller into a hinged concave C. This concave, it will be observed, has ratchet-shaped teeth cut in it; the teeth nearest the pivot of the concave being coarser than the teeth at its edge, the said teeth being graduated from coarse to fine. The concave, C, is supported by the wedge D, which is operated by a suitable screw so as to raise or lower the concave C, nearer to or farther from the grinding roller E. This roller revolves in the direction indicated by arrow, crushing the coffee beans first against the coarse teeth and finally against the fine teeth. The ground coffee falls over the edge of the concave onto the longitudinal corrugated tray F. This tray is supported, as shown, on the shoe G, which is carried by the flexible supports H, located on each end of the shoe, as shown in the drawings. A pitman I, connects the shoe G, to an eccentric fixed to the main driving shaft J, so that the said shaft will give the trays a reciprocating shaking movement during the time that the machine is in operation. When the coffee falls on the corrugated tray F, the fine coffee will naturally be shaken to the bottom corrugations, and the coarse coffee will lie on top of the fine, while the husks and light foreign matter will remain on top of the coarse coffee. Owing to the movement of the tray the coffee is gradually shaken to the edge of the said tray, and as it passes below the spout of the exhaust fan K, the husks and light foreign matter are drawn off by the action of the said fan, which discharges the said light matter to any point desired.

It will of course be understood that the spout of the exhaust fan is arranged so as to form an opening extending across the end of the tray F. From the tray F, the coffee falls into the plain smoothed-faced tray L, and from it onto a screen M, the screen M, and tray L, being held in the shoe G, as shown. The screen M, is made a proper mesh to permit only the coffee ground to the required fineness to pass through onto the bottom, N, and is finally discharged through it to the spout O, which is connected to the bottom N. The coarse coffee which will not pass through the screen M, is carried toward the end of the said screen where it falls over into a spout P, (see Fig. 3) which fills the said coarse coffee into the tube Q. An Archimedean screw R, is placed in the tube Q, and as it revolves, it raises the coarse coffee and discharges it into the hopper A, from which it again passes through the mill. By thus grinding and regrinding the coffee I secure a uniform grade.

On reference to Fig. 2, it will be observed that an opening is made in the bottom immediately below the discharge end of the tray L. This opening in the tray is covered by a fine screen, shown by dotted lines, and covered by a board S. When I wish to have very fine coffee, I remove the board S, and let the coffee sift through into the bottom.

Although my mill is especially designed for grinding coffee, it will of course be understood that it may be used for grinding anything it is adapted for.

What I claim as my invention is—

1. The combination of the feed roller A', geared to the loose pinion H', spring clutch E', and shaft C', geared to the grinding roller E, substantially as and for the purpose specified.

2. The combination of the feed roller A', bevel pinion B', bevel pinion H', loose on shaft C', spring clutch E', worm wheel F', and worm G', on the shaft of the grinding roller E, substantially as and for the purpose specified.

3. In a grinding machine, a grinding roller, a concave adapted to work in connection with said roller in combination with the corrugated tray F, a fan arranged at the end of said tray to draw away the husks, a screen below said tray, shoes G supporting said tray and screen, means, substantially as described, for giving said shoes a vibrating motion, a spout O at the end and below said screen for discharging the ground material and a spout P also at the end of said screen arranged to deliver the material from off the screen into the tube Q, and an elevator in said tube for raising the material to the grinding mechanism, substantially as shown and described.

Brantford, December 31, 1891.

E. SCHMIDLIN.

In presence of—
 WALTER A. WILKERS,
 J. EDW. MAYBEE.